United States Patent [19]

Sharp

[11] Patent Number: 5,007,260
[45] Date of Patent: Apr. 16, 1991

[54] BICYCLE LOCKING SYSTEM

[76] Inventor: Harry Sharp, 430 Sanchez, Apt. B, San Francisco, Calif. 94114

[21] Appl. No.: 546,241

[22] Filed: Jun. 29, 1990

[51] Int. Cl.[5] ............................................. E05B 71/00
[52] U.S. Cl. ...................................... 70/233; 70/231; 70/232
[58] Field of Search ................... 70/231, 233, 232, 229

[56] References Cited

U.S. PATENT DOCUMENTS

| | | |
|---|---|---|
| 1,921,434 | 8/1933 | Stone . |
| 2,055,289 | 9/1936 | Hanan . |
| 3,855,825 | 12/1974 | Pickard . |
| 3,988,910 | 11/1976 | Wilden . |
| 4,028,915 | 6/1977 | Stahl . |
| 4,057,985 | 11/1977 | Stahl ..................... 70/233 |
| 4,114,409 | 9/1978 | Scire . |
| 4,290,284 | 9/1981 | Nicksic . |
| 4,621,873 | 11/1986 | Weinstein et al. . |
| 4,724,692 | 2/1988 | Turin et al. . |
| 4,770,011 | 9/1988 | Constant . |
| 4,807,204 | 4/1989 | Cucheran . |

FOREIGN PATENT DOCUMENTS

| | | |
|---|---|---|
| 141945 | 6/1935 | Austria . |
| 1198922 | 7/1970 | United Kingdom . |

*Primary Examiner*—Robert L. Wolfe
*Attorney, Agent, or Firm*—Phillips, Moore, Lempio & Finley

[57] ABSTRACT

A locking system for use with a wheeled vehicle such as a bicycle is described. The system is useful either to lockingly secure a wheel to the fork members of a bicycle or to lockingly secure the seat post to the center frame member. The locking member is cylindrical in shape and covers a specially configured nut that replaces the usual lever operated nut used with a spindled axle system.

19 Claims, 3 Drawing Sheets

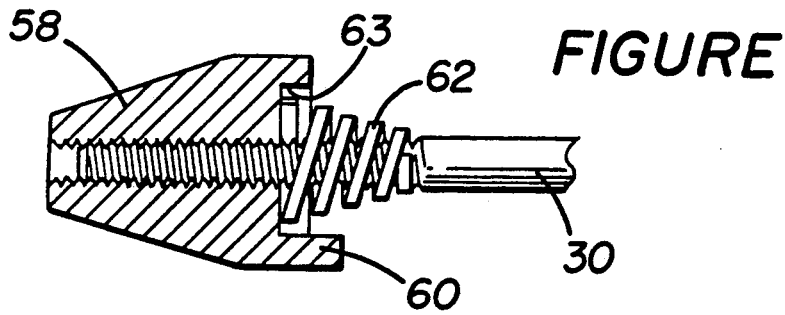
FIGURE 8
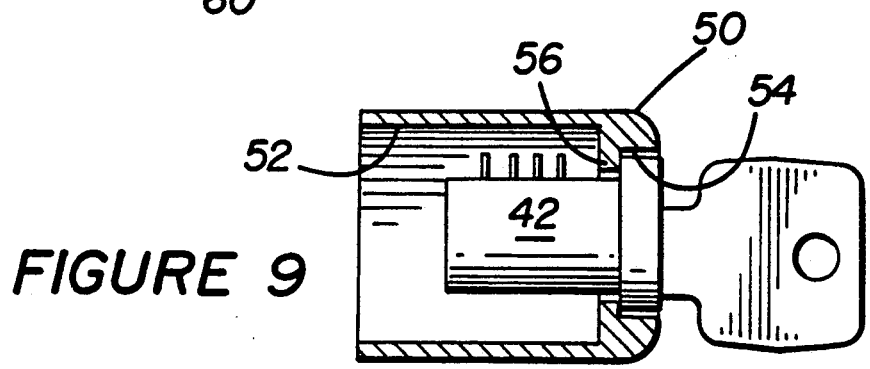
FIGURE 9
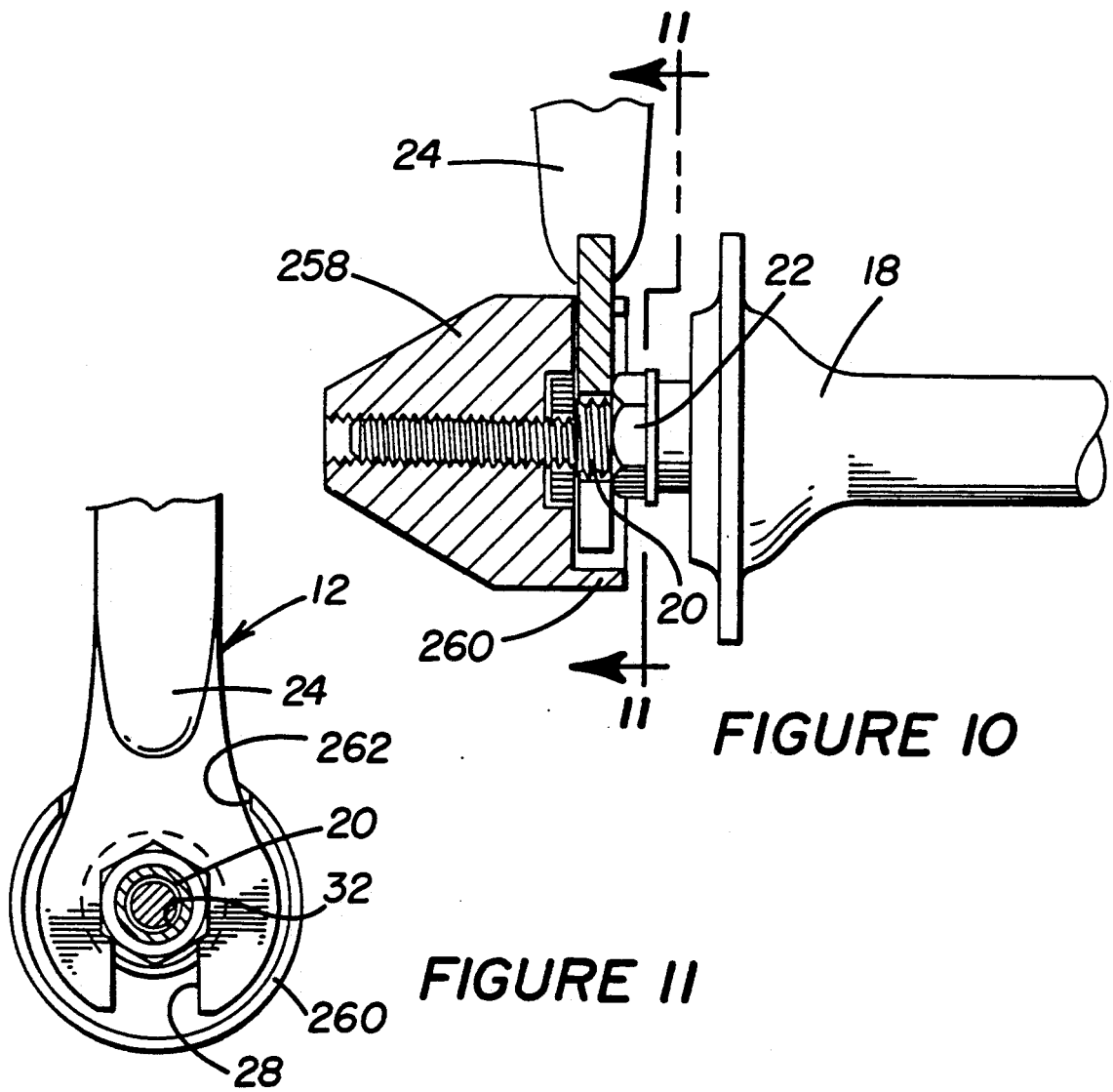
FIGURE 10
FIGURE 11

BICYCLE LOCKING SYSTEM

TECHNICAL FIELD

This invention relates to a locking system for lockingly securing a wheel or a bicycle seat to a bicycle.

BACKGROUND OF THE INVENTION

The wheels of a wheeled vehicle such as a bicycle are ordinarily secured to the bicycle by either hexagonal shaped nuts or in the more recent bicycles by a lever actuated securing means such that the wheel can be readily removed. In the case of the hexagonal nut one merely needs an adjustable wrench to quickly remove either the front or the back wheel for whatever purpose. In a similar manner bicycle seats, which in recent years have become relatively expensive, can likewise be removed by the use of an adjustable wrench loosening the hexagonal nut that ordinarily is used to retain the seat post in the center frame member of the bicycle.

As a consequence to prevent theft it has become rather ordinary for the bicyclist to remove the wheel and the seat, usually the front wheel, and then lock the front and back wheels with the bicycle to some permanently fixed post or the like. The seat, which is difficult to lock with the wheels, is generally carried with the bicyclist. Upon return the bicyclist the must then reassemble his or her bicycle before proceeding.

The lever actuated systems, that for years have been used by bicycle road racers, ease the chore of removing the wheels from the bicycle however, it is also eases the tasks of the thief should the wheel not be removed. Because of the upsurge in thefts of bicycle seats, similar lever actuated devices are now used on bicycle seats so that the seat may be removed upon parking the bicycle.

The lever mechanism to release the wheel from the frame in the conventional situation includes an eccentric cylinder acting as a cam and rotatable by crank arm which, when actuated, serves to move a spindle laterally through the axle of the wheel such that with the crank arm or lever in one position the wheel is secured to the fork while rotation of the lever 90° will move the spindle so that the wheel is free to be removed from the forks. Such a device is well-known in the art and will not be further described herein.

In recent years devices have appeared in the market which serve to lock the lever arm in its clamped position so that it cannot be rotated to release the wheel from the bicycle. These devices fall into two categories. The first category includes those devices that either insert a pin to prevent rotation or that disengage the lever arm from the spindle. Such devices are exemplified by U.S. Pat. No. 4,724,692 issued on Feb. 16, 1988. In the second type of structure, a cover or the like is locked to the axle of the bicycle so that the lever is not accessible or cannot be turned by the prospective thief. This type of device is exemplified by U.S. Pat. No. 4,028,915.

In both these types of systems a rather cumbersome addition must be made to the wheel which not only increases the weight of the bicycle but also provides an additional snagging point should the bicycle be operated to close to some other device.

Further, there apparently have been no locking devices that have been in the marketplace to secure the bicycle seat to the frame of the bicycle. Possibly this is because bicycle seats have just recently increased in price.

Accordingly, this invention provides a system which is adaptable either to secure both the front and the rear wheel to a bicycle frame at the front or rear forks or which is adaptable to secure the seat post to the center frame bifurcated member.

It is an object of this invention to provide a lightweight simple to operate locking system for securing a removable component to a bifurcated portion of a wheeled vehicle.

It is an additional object of this invention to provide a locking system to secure a wheel to one or the other or both forks of a bicycle.

It is still a further object of this invention to provide a locking system to secure a seat and seat post to the center frame member of a bicycle.

SUMMARY OF THE INVENTION

This invention is a locking system for lockingly affixing a removable component between a bifurcated portion of a wheeled vehicle. The invention includes shafting for passing between the bifurcated portions of the wheeled vehicle, such shafting defining an axial bore therethrough. A spindle device is provided for passing through the shaft bore. The spindle has an integrally attached enlarged end formed to receive a wrench capable of turning the spindle. The spindle further defines a threaded end distal of the enlarged end. A lug is threadably engageable with the spindle threaded end, with the lug defining an engagement system for engaging the bifurcated portion so that the lug becomes non-removable when the spindle is threadably engaged therewith and when the spindle is passed through the shaft bore. A cylindrically shaped lock rotatably covers the enlarged end of the spindle whereby the enlarged end cannot be rotated to disengage the spindle from the lug.

BRIEF DESCRIPTION OF THE DRAWINGS

FIG. 5 is a sectional view of the enlarged end and cover member taken at section line 5—5 of FIG. 1.

FIG. 6 is an end view of the cover member taken at section line 6—6 of FIG. 1.

FIG. 7 is a sectional view of a portion of the lug member and the associated bicycle fork as taken at section line 7—7 of FIG. 1.

FIG. 8 is a sectional view of the lug used with the bicycle wheel and showing the volute spring.

FIG. 9 is a sectioned view of the cover and locking cylinder.

FIG. 10 is an alternate embodiment of the lug member utilized in the wheel locking system.

FIG. 11 is a view taken at section line 11—11 of FIG. 10.

DETAILED DESCRIPTION OF THE PREFERRED EMBODIMENTS

Figure 1:
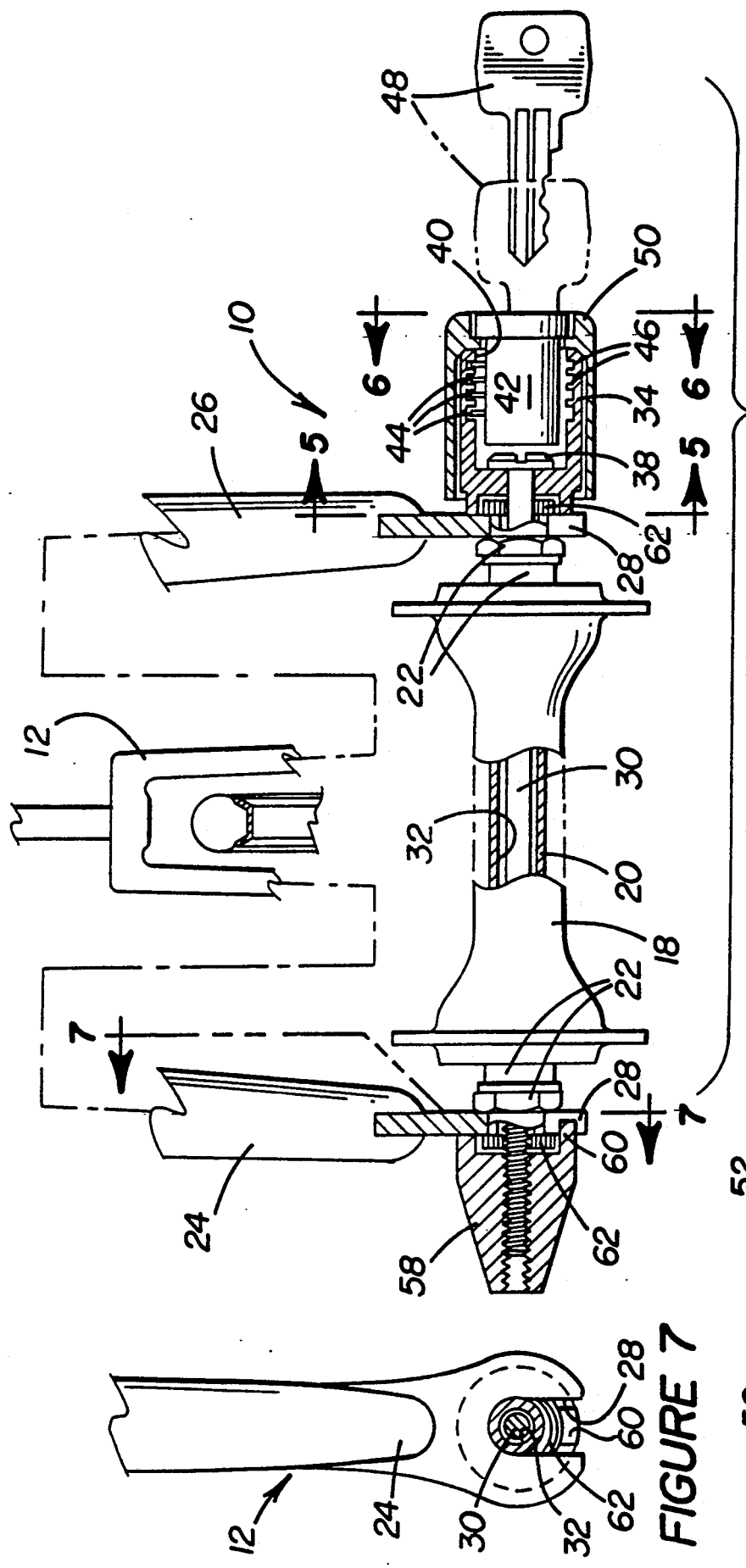
FIG. 1 is an elevation view, partly in section, of the locking system described herein as adapted for use on a bicycle wheel.
Figure 2:
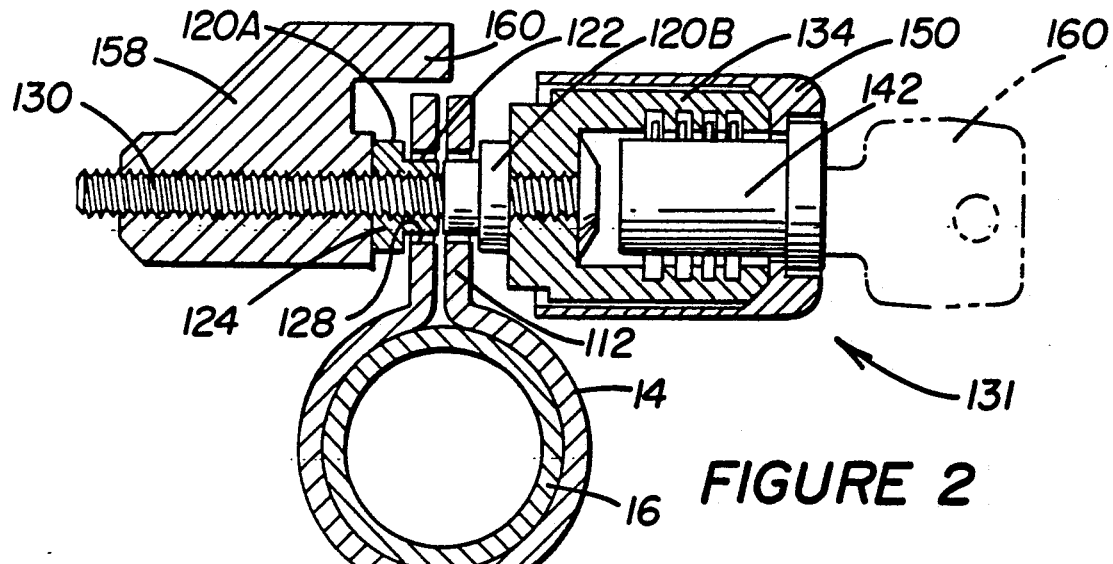
FIG. 2 is a top view, partly in section of the locking system described herein as adapted for use on a bicycle seat.
Figure 4:
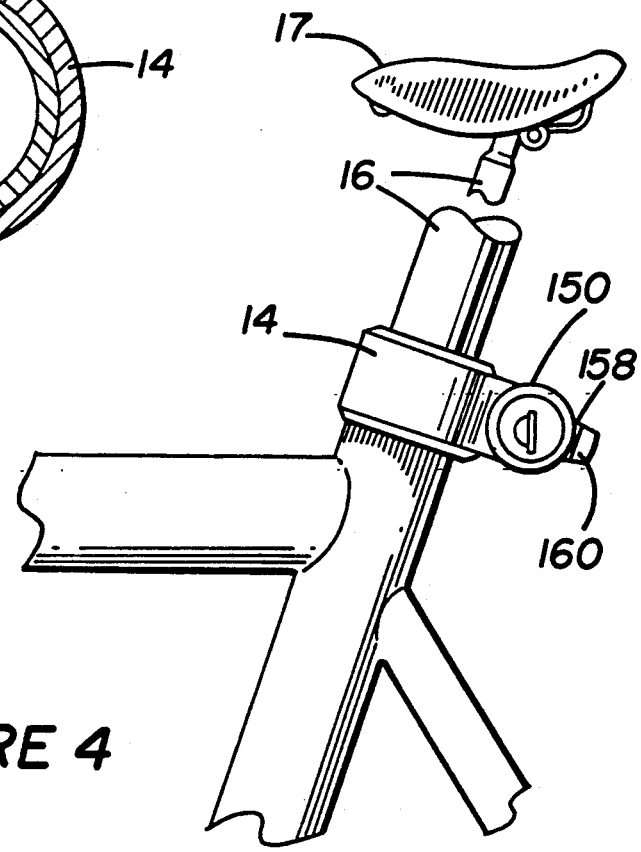
FIG. 4 is a side view of a portion of a bicycle frame showing the locking system being used to secure a seat post and seat.

Referring now to FIG. 1, a locking system 10 is illustrated partly in section. The environment of locking system 10 is a wheeled vehicle such as a bicycle, portions of which are shown in the drawings included with this description. Specifically, a bicycle includes certain bifurcated members such as forks 12 which are shown schematically in FIG. 1. Such forks are utilized to rotatingly attach both the front wheel and the rear wheel to the bicycle itself. In addition, a bifurcated member such as frame center post 14 as shown in FIGS. 2 and 4 is utilized to affix a bicycle seat post 16 to the bicycle. Attached to bicycle seat post 16 would be a bicycle seat 17 (shown in reduced size). More will be said about the center post 14 and the bifurcated nature thereof in the ensuing discussion.

Referring again to FIG. 1, the wheels of a bicycle are generally spoked and are formed about a hub 18 which in turn rotates about an axle 20 that is affixed to the hub 18 by bearings (not shown) in a manner well-known in the art. Ordinarily the bearings are retained within the hub 18 by a bearing cone (not shown) and a series of locking nuts 22 that are threadably engaged on axle 20. The axle in turn is adapted to be received between the tines 24 and 26 of fork 12. At this point it should be pointed out that forks are utilized both for the front and rear wheels of the bicycle. While the structure may vary because of the steerable nature of the front fork, the wheel mounting is the same.

Bifurcated fork 12 has at each end of tines 24 and 26 forming a slot 28 which can slidingly receive axle 20. This is best seen in FIG. 1 wherein axle 20 and hub 18 are shown partly in section.

In order to retain the assembled wheel and hub 18 within the confines of the bifurcated ends of the fork 12, a spindle 30 is passed through a longitudinal bore 32 defined in shaft or axle 20 as shown in the center portion of hub 18 in FIG. 1. Affixed at one end of spindle 20 is an enlarged portion 34. This enlarged portion 34 can been seen in an end view in FIG. 5. Enlarged portion 34 appropriately should take on a non-cylindrical shape so that a wrench or spanner can be used to turn spindle 30 within bore 32. In the preferred embodiment this non-cylindrical shape is hexagonal however, other shapes such as pentagonal or triangular could be utilized as long as a special spanner is provided to rotate the enlarged end 34. Enlarged end 34 itself is integrally formed with spindle 30. Conveniently a threaded bore 36 may be formed in the end of enlarged end 34 proximate spindle 30. Spindle 30 may likewise be formed with a threaded end to be received in threaded bore 36. Once received in threaded bore 36 the end of spindle 30 may be peened over in a riveted manner such as shown by mushroom head 38. Other means of integrally affixing spindle 30 to enlarged end 34 may also be used, including welding or casting or forging the two as one part with subsequent machining.

Enlarged portion 34 has axially formed, distal of spindle 30, a cylindrical bore 40 adapted to receive a locking cylinder 42. Locking cylinder 42 is commercially available from Cosmic Car Accessories, Sadler Road, Brownhill, Waldsall, WS8 6NA, United Kingdom. Locking cylinder 42 has extending outwardly therefrom a plurality of spring biased pins 44 which can be received in radial grooves 46 formed about bore 40 thereby precluding withdrawal of the locking cylinder 42 without utilizing a key 48 to retract the pins 44 within the cylinder 42.

A cylindrical cover member 50 with an internal bore 52 sufficiently large to cover enlarged end 34 is best shown in FIG. 5. Cylindrical member 50 includes an opening 54 at one end thereof. In addition a shoulder 56 is formed about the interior of cylinder 50 adjacent opening 54 so that locking member 42 may pass into the opening 54 but the shoulder 56 prevents the locking member from passing further into the bore 52. When inserted in this manner and placed over the enlarged end 34 so that locking cylinder is interior of bore 40, the key 48 may be withdrawn and the cylindrical locking means which is comprised of the cover member 50 and the locking cylinder 42 is retained on enlarged end 34 and in fact is rotatable thereabout so that the hexagonal shape of the enlarged end 34 cannot be rotated with a wrench.

At the opposite end of spindle 30 is a conical-shaped lug 58 which is threadably engageable on spindle 30 as shown in FIG. 1. Conical-shaped lug includes a key 60 which fits into slot 28 when the hub 18 and shaft or axle 20 are fitted between the fork 12. The key 60 prevents rotation of the conical lug while fitted to the fork 12.

Also included in the invention are a pair conically-shaped volute springs 62 that are placed at either end of the system. The volute spring 62 is positioned between the end of shaft or axle 20 and the conical-shaped lug at one end while at the other end a similar volute spring is positioned between the enlarged end 34 and the end of axle 20. The volute spring, having a conical-shape when at rest is placed with the apex adjacent axle 20 and the base adjacent enlarged end 34 or the lug 58. In this arrangement, the volute will compress into itself and in turn into cavities 61, and 63 formed into enlarged end 34 and lug 58. These cavities are sufficiently deep that the spring is not damaged when the bearing surface of the enlarged end or the lug are snugged up against the tines of the fork. The use of the springs will become apparent in the ensuing description of how the device is utilized.

OPERATION OF THE WHEEL LOCKING SYSTEM

In operation the wheel locking system is first assembled with the spindle 30 passing through the bore 32 of shaft or axle 20 as shown in FIG. 1. It should be remembered that one of the two volute springs 62 is positioned between the enlarged end 34 and the axle 20. At the other opposite end in the second volute spring is likewise positioned against the opposite end of axle 20 and the conical-shaped lug 58 is then threadably engaged with spindle 30. With the springs placed in this manner the enlarged end and the lug are biased away from the hub thereby easing installation on the fork. The whole assembly is then placed between the bifurcated member or fork 12 in the manner shown in FIG. 1. At this point the cover 50 has not been placed over the enlarged end 34. This enables the user to tighten the enlarged end 34 utilizing a standard spanner or wrench to the degree necessary. The user must insure that the key 60 of the conical-shaped lug is located between the split ends of the fork 12 as shown in FIG. 7. Once the requisite amount of torque has been applied, then cover member 50 is placed over the enlarged end 34 as shown in FIG. 1 and locking member 42 inserted in internal bore 40 of enlarged end 34 and through opening 54 of the cover member. Key 48 is then withdrawn and the locking member is then engaged with enlarged end 34 by means of the pins 44 engaging the grooves 46 of the enlarged end. At this point rotation of enlarged end 34 is precluded because of cylindrical cover 50 is freely rotatable about enlarged end 34 and at the other end conically-shaped lug 59 cannot be gripped and even if it could key 60 would prevent rotation.

DESCRIPTION OF THE SEAT LOCKING SYSTEM

Referring now to FIG. 2, a similar locking system is disclosed for utilization on a center post 14 of a bicycle frame to secure the seat post 16 to the bicycle. Since the locking member is the same as that described in the bicycle wheel application above like numbers be used in this description of the seat member however, with the prefix of 100.

The bifurcated ends or ears 112 of the center post include an axially aligned bore 128. In the conventional bicycle a bolt is ordinarily passed through these bores to draw the bifurcated ends 112 of the center post 14 together in order to clamp the seat post 16 in a desired position. In this invention, a shaft in the form of two cylindrical members 120a and 120b are placed through bore 128. The shaft members 120a and 120b are identical in shape and include a first portion 122 having an outside diameter sized to be received in bore 128 and a second portion 124 which is enlarged and acts as a washer to preclude the shaft assembly from passing through the bore 128. The shaft assembly parts 120a and 120b each have an internal bore so that a spindle 130 may pass therethrough. Spindle 130 is affixed an enlarged end 134 in the same manner as described with the wheel locking enlarged member 34. The shaft members 120a and 120b may be omitted, however the key 160 may become lodged against the center post In like manner, a cover 150 and a cylindrical locking assembly 142 complete the locking assembly 131 of the seat system. At the opposite end of spindle 130 is a threaded generally cylindrical lug 158 which includes a key 160 extending toward enlarged end 134 when lug 158 is threadably engaged on spindle 130. The key 160 prevents rotation of the lug 150 when the seat locking assembly is installed through the bifurcated ends of center post 14 as shown in FIG. 2.

OPERATION OF THE PREFERRED EMBODIMENT OF THE SEAT LOCKING ASSEMBLY

In operation the seat locking assembly is utilized in manner similar to that described with the wheel locking assembly. Specifically, the spindle has placed thereupon one of the two shaft assemblies 120a and the two are passed through the bore 128 of the bifurcated ends. The second portion of the shaft assembly 120b is then placed in position as shown in FIG. 2. The keyed lug 158 is threadably engaged on the end of spindle 130 and aligned so that the key 160 is adjacent to bifurcated ends of the center post. At this point the enlarged end 134, which is integrally affixed to the spindle 130, is rotated to the point where the bicycle seat post 16 is locked in position on center post 14. The cover assembly 150 and the locking member 142 are then placed over and into the enlarged end respectively so that the cover is locked thereupon and may be rotated freely about the enlarged end 134 without rotation of the spindle 130 so that the seat cannot be removed from the bicycle.

ALTERNATE EMBODIMENTS

Referring now to FIG. 10 and 11, an alternate embodiment is shown for the conical-shaped lug 58 described above. In this embodiment the conical-shaped lug 258 is formed with a skirt 260 which extends around the end of the fork 12. An interruption 262 in skirt 260 is formed so that the conical-shaped lug 258 can effectively be a cover over the end of the fork 12. With the interruption 262 positioned as shown in FIGS. 10 and 11, the conical-shaped lug 258 cannot be rotated when the assembly is placed on a bicycle as described above with the principal embodiment.

Figure 3:
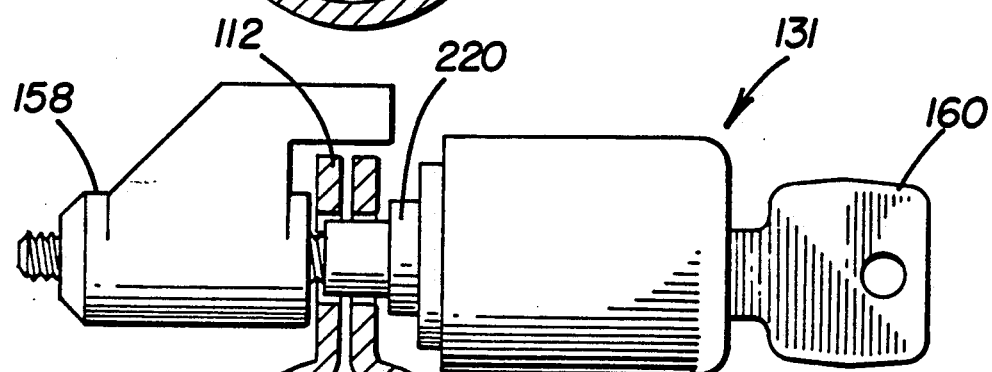
FIG. 3 is an alternate embodiment of the system shown in FIG. 2.

In FIG. 3, with respect to the seat lock, the two shaft assemblies 120a and 120b are replaced with a single lugged shaft assembly 220. With the embodiment shown in FIG. 3 it may or may not be appropriate to utilize a washer (not shown) between lug 158 and the bifurcated ends 112 of the center post 14. A washer is not absolutely necessary as the lug 158 is not rotated relative to the bifurcated ends 112 upon assembly of the system.

In both the alternate embodiments operation is identical to the principal embodiments so that no further discussion is necessary.

While this invention has been claimed in relation to specific embodiments, it is not to be so limited but is rather to be limited only by the attached claims.

I claim:

1. A system for lockingly affixing a removable component between a bifurcated portion of a wheeled vehicle comprising:
   shaft means for passing between the bifurcated portion of the wheeled vehicle, said shaft means defining a bore therethrough;
   spindle means for passing through said shaft means bore, the spindle means having an integrally formed enlarged end, said enlarged end formed to receive a wrench capable of turning said spindle means and said spindle means further defining a threaded end distal of said enlarged end;
   a lug threadably engageable with said spindle means threaded end, said lug defining engagement means for engaging said bifurcated portion whereby said lug becomes non-removable when said spindle means is passed through said shaft means bore and when said spindle means is threadably engaged therewith; and
   cylindrically shaped lock means for rotatably covering said enlarged end while said spindle means is passed through said shaft means and said lug is engaged with said bifurcated portion.

2. The system of claim 1 wherein said enlarged end defines an axial bore distal of said spindle, said axial bore having at least one outwardly extending radial groove thereabout; and
   wherein cylindrical shaped lock means includes a locking cylinder having at least one outwardly extending spring biased pin adapted to be received in said axial bore of said enlarged end such that said spring biased pin will engage the at least one outwardly extended radial groove formed in said axial bore of said enlarged end.

3. The system of claim wherein the bifurcated portion of the wheeled vehicle is a front fork of a bicycle, said front fork adapted to slidingly receive said shaft means, and wherein the lug is generally conical in shape and said engagement means is formed to engage at least one tine of said fork.

4. The system of claim wherein the bifurcated portion of the wheeled vehicle is a front fork of a bicycle, said front fork adapted to slidingly receive said shaft means, and wherein the lug is generally conical in shape and said engagement means is formed to at least partially overlay at least one tine of said fork.

5. The locking system of claim 1 wherein the bifurcated portion of the wheeled vehicle is the bifurcated upper end of the center frame member of a bicycle adapted to receive a bicycle seat post, and wherein said bifurcated upper end of said frame member defines a pair of outwardly extending ears, said ears defining coaxially aligned holes, and wherein said shaft means is adapted to be receive through said 10 axially aligned holes, and further wherein said engagement means is formed to at least partially overlay both ears whereby said engagement means is prevented from rotating when so mounted.

6. The locking system of claim 5 wherein said shaft means includes at least one cylindrical member, said cylindrical member defining an axial bore of a size sufficient to receive said spindle means.

7. The locking system of claim 6 wherein the cylindrical member includes a first portion having a diameter less than the diameter of the coaxially aligned holes in said ears and a second portion having a diameter greater than the diameter of the coaxially aligned holes.

8. The locking system of claim 7 wherein said shaft means includes two cylindrical members, where the first portion of each cylindrical member has a length less than one half the thickness of the combined thickness of the extending ears.

9. The locking system of claim 7 wherein the first portion of said cylindrical member has a length greater than one half the combined system of the extending ears but less than the combined thickness thereof.

10. The system of claim 1 further including first resilient means positionable about said spindle means between said shaft means and either said lug or said enlarged end whereby with said lug when threadably engaged on said spindle, said lug or said cylindrically shaped lock means is biased away from said shaft means.

11. The system of claim 10 further including a second resilient means positionable about said spindle means and located adjacent the other of said lug or said enlarged end and said shaft means whereby said lug and said enlarged end are biased away from said shaft means.

12. The system of claim 11 where each of said resilient means are conical volute springs.

13. The system of claim 2 wherein said enlarged end has a hexagonal exterior shape.

14. A wheel securing system for a bicycle, the bicycle having front and rear wheel mounting forks, the wheels being mountable therebetween with their respective axles, said axles each defining an axial bore therethrough;

the securing system comprising:

spindle means for passing through said shaft means axial bore, said spindle means having an integrally formed enlarged end, and said spindle means further defining a threaded end distal of said enlarged end;

a lug threadably engageable with said spindle threaded end, said lug defining engagement means for engaging said bifurcated portion whereby said lug becomes non-removable when said spindle means is passed through said shaft means bore and when said spindle manes is threadably engaged therewith; and cylindrically shaped lock means for rotatably covering said enlarged end while said spindle means is passed through said shaft means and said lug is engaged with said bifurcated portion.

15. The system of claim 14 wherein the lug is generally conical in shape and said engagement means is formed to engage at least one tine of said fork.

16. The system of claim 15 further including first resilient means positionable about said spindle means between said shaft means and either of said lug or said enlarged end whereby said lug when threadably engaged on said spindle, said lug or said enlarged end is biased away from said shaft means.

17. The system of claim 16 further including a second resilient means positionable about said spindle means and located adjacent the other of said lug or said enlarged end and said shaft means where said lug and said enlarged end are biased away from said shaft means.

18. The system of claim 17 where each of said resilient means are conical volute springs.

19. A bicycle seat securing system, the bicycle having a bifurcated center frame member, the bicycle seat being affixed to a seat post which is mountable in said center frame member, said center frame member including outwardly extending ears from said bifurcated portion each defining coaxial bores;

the securing system comprising:

spindle means for passing through said coaxial bores, said spindle means having an integrally formed enlarged end, and said spindle means further defining a threaded end distal of said enlarged end;

a lug threadably engageable with said spindle threaded end, said lug defining engagement means for engaging said ears whereby said lug becomes non-removable when said spindle means is passed through said coaxial bores and when said spindle manes is threadably engaged therewith; and cylindrically shaped lock means for rotatably covering said enlarged end while said spindle means is passed through said coaxial bores and said lug is engaged with said bifurcated portion.

* * * * *

UNITED STATES PATENT AND TRADEMARK OFFICE
CERTIFICATE OF CORRECTION

PATENT NO. : 5,007,260
DATED : April 16, 1991
INVENTOR(S) : Harry Sharp

It is certified that error appears in the above-identified patent and that said Letters Patent is hereby corrected as shown below:

Column 1, line 28, after bicyclist in the second instance, delete "the".

IN THE CLAIMS:

Claim 3, column 6, line 1, after "claim" insert -- 1 --.

Claim 4, column 7, line 1, after "claim" insert -- 1 --.

Claim 14, column 8, line 14, delete "manes" and insert -- means --.

Claim 19, column 8, line 52, delete "manes" and insert -- means --.

Signed and Sealed this

Twenty-fifth Day of August, 1992

*Attest:*

DOUGLAS B. COMER

*Attesting Officer*  *Acting Commissioner of Patents and Trademarks*